(12) United States Patent
Shimada et al.

(10) Patent No.: US 10,754,135 B2
(45) Date of Patent: Aug. 25, 2020

(54) LIGHT SHEET MICROSCOPE AND CONTROL METHOD FOR LIGHT SHEET MICROSCOPE

(71) Applicant: OLYMPUS CORPORATION, Hachioji-shi, Tokyo (JP)

(72) Inventors: Yoshihiro Shimada, Sagamihara (JP); Yujin Arai, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 156 days.

(21) Appl. No.: 15/629,467

(22) Filed: Jun. 21, 2017

(65) Prior Publication Data

US 2017/0371136 A1 Dec. 28, 2017

(30) Foreign Application Priority Data

Jun. 28, 2016 (JP) .................................. 2016-128146

(51) Int. Cl.
 *G02B 21/00* (2006.01)
 *G02B 21/36* (2006.01)
 *G02B 21/06* (2006.01)
 (Continued)

(52) U.S. Cl.
 CPC ............ *G02B 21/0032* (2013.01); *G01J 1/44* (2013.01); *G01N 21/6428* (2013.01);
 (Continued)

(58) Field of Classification Search
 CPC .. G02B 21/0032; G02B 21/367; G02B 21/06; G02B 21/0076; G02B 21/006;
 (Continued)

(56) References Cited

U.S. PATENT DOCUMENTS

| 9,645,378 B2 | 5/2017 | Hilbert et al. |
| 2003/0184856 A1* | 10/2003 | Otaki .................... G02B 7/28 |
| | | 359/383 |

(Continued)

FOREIGN PATENT DOCUMENTS

| JP | 2015537236 A | 12/2015 |
| WO | 2014056992 A1 | 4/2014 |
| WO | 2015184124 A1 | 12/2015 |

OTHER PUBLICATIONS

Extended European Search Report (EESR) dated Nov. 14, 2017 issued in counterpart European Application No. 17177377.3.
Jorand, et al., "Deep and Clear Optical Imaging of Thick Inhomogeneous Samples", PLOS One, Apr. 25, 2012: vol. 7, Issue 4.
Weber, et al., "Chapter 11—Light sheet microscopy", Methods in Cell Biology, vol. 123, Dec. 31, 2014.
Jorand, et al., "Deep and Clear Optical Imaging of Thick Inhomogeneous Sample", PLOS One, Apr. 25, 2012: vol. 7, Issue 4.
(Continued)

*Primary Examiner* — Tat C Chio
(74) *Attorney, Agent, or Firm* — Holtz, Holtz & Volek PC

(57) ABSTRACT

A light sheet microscope includes an objective, an illumination optical system, a first adjustor, a second adjustor and a controller. The illumination optical system irradiates sample with a light sheet from a direction that is different from an optical axis direction of the objective. The first adjustor adjusts a relative position between a light sheet plane on which the light sheet is formed and the objective in an optical axis direction of the objective. The second adjustor adjusts a relative position between the light sheet plane and the sample in an optical axis direction of the objective. The controller controls the first adjustor on the basis of light that is from the light sheet plane and that is detected via the objective when a relative position between the light sheet plane and the sample is changed by the second adjustor.

9 Claims, 15 Drawing Sheets

(51) Int. Cl.
  *G01J 1/44* (2006.01)
  *G01N 21/64* (2006.01)

(52) U.S. Cl.
  CPC ....... *G01N 21/6458* (2013.01); *G02B 21/006* (2013.01); *G02B 21/0076* (2013.01); *G02B 21/06* (2013.01); *G02B 21/367* (2013.01); *G01J 2001/4453* (2013.01); *G01N 2021/6439* (2013.01); *G01N 2021/6463* (2013.01); *G01N 2201/0612* (2013.01)

(58) Field of Classification Search
  CPC .......... G01N 21/6428; G01N 21/6458; G01N 2021/6463; G01N 2021/6439; G01N 2201/0612; G01J 1/44; G01J 2001/4453
  See application file for complete search history.

(56) References Cited

U.S. PATENT DOCUMENTS

2013/0094755 A1  4/2013  Lippert et al.
2015/0286042 A1* 10/2015 Hilbert ................ G02B 21/002
                                                250/459.1

OTHER PUBLICATIONS

Webster, et al., "Chapter 11—Light sheet microscopy", Methods in Cell Biology, vol. 123.
Japanese Office Action (and English language translation thereof) dated Jan. 7, 2020 issued in Japanese Application No. 2016-128146.

* cited by examiner

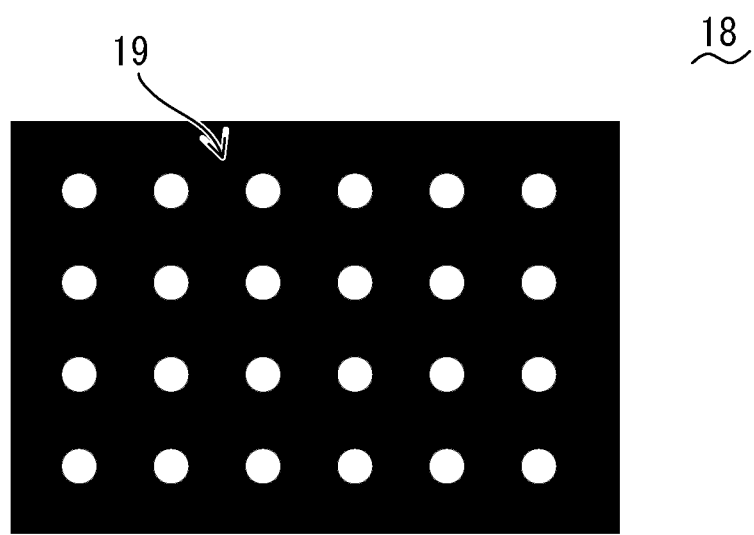
F I G. 4

LIGHT SHEET MICROSCOPE AND CONTROL METHOD FOR LIGHT SHEET MICROSCOPE

CROSS REFERENCE TO RELATED APPLICATIONS

This application is based upon and claims the benefit of priority from prior Japanese Patent Application No. 2016-128146, filed Jun. 28, 2016, the entire contents of which are incorporated herein by this reference.

BACKGROUND OF THE INVENTION

Field of the Invention

The disclosure of the present invention is related to a light sheet microscope and a control method for a light sheet microscope.

Description of the Related Art

In the field of fluorescence microscopes, a technique is known in which a sample is irradiated with a laser beam from a direction that is orthogonal to the optical axis of the objective so as to form, in the sample, a light sheet orthogonal to the optical axis of the objective. A light sheet microscope using this technique is disclosed in for example U.S. Unexamined Patent Application Publication No 2015/0286042 and International Publication Pamphlet No. WO2015/184124. Light sheet microscopes can generate an excellent 3-D image of a sample at a high speed with suppressed fading of fluorescence, which is a great advantage.

In recent years, purposes of this technique are not limited to the obtainment of a 3-D image of a creature such as zebrafish that is labeled with fluorescent protein as a target molecule. This technique draws attention also as a technique aiming to be applied to so-called "drug-discovery screening", in which medical effects are evaluated by obtaining a 3-D image of a 3-D cultured cell such as spheroid or organoid and using an image analysis technique. This technique is expected to be applied to a wide range of applications.

SUMMARY OF THE INVENTION

A light sheet microscope according to an aspect of the present invention includes an objective, an illumination optical system that irradiates sample with a light sheet from a direction that is different from an optical axis direction of the objective, first adjustor for adjusting a relative position between a light sheet plane on which the light sheet is formed and the objective in the optical axis direction of the objective, second adjustor for adjusting a relative position between the light sheet plane and the sample in the optical axis direction of the objective, and a controller that controls the first adjustor on the basis of light that is from the light sheet plane and that is detected via the objective when a relative position between the light sheet plane and the sample is changed by the second adjustor.

A control method for a light sheet microscope having an objective according to another aspect of the present invention includes irradiating sample with a light sheet from a direction that is different from an optical axis direction of the objective, adjusting a relative position between a light sheet plane on which the light sheet is formed and the sample in the optical axis direction of the objective, adjusting a relative position between the light sheet plane and the objective in the optical axis direction of the objective on the basis of light that is from the light sheet plane and that is detected via the objective when a relative position between the light sheet plane and the sample is adjusted, and obtaining an image of the sample that is irradiated with the light sheet.

BRIEF DESCRIPTION OF THE DRAWINGS

The present invention will be more apparent from the following detailed description when the accompanying drawings are referenced.

FIG. 4 exemplifies a configuration of a light shielding plate 18 including a pinhole array 19;

DESCRIPTION OF THE EMBODIMENTS

In order to obtain a 3-D image of a sample, a light sheet microscope usually obtains a plurality of cross-sectional images while relatively moving the light sheet and the sample along the observation optical axis (optical axis of the objective). In many cases, the light sheet and the objective are fixed after the light sheet is set to be formed on the focal plane of the objective. Then, a plurality of cross-sectional images are obtained by sequentially moving the sample in the optical axis direction.

However, a change of an observed location of the sample (i.e., a plane on which the light sheet is formed in the sample, which will be referred to as a light sheet plane) in this method changes a component ratio of media between the objective and the light sheet plane (e.g., the ratio between the air, the culture solution and the inside of the sample). Thereby, the optical path length between the objective and the light sheet plane changes. This results in a situation where even when the objective is not moved, the focal plane of the objective moves in the optical axis directions and the focal plane of the objective does not coincide with the light sheet plane. Also, the refractive-index distribution in the sample also changes the movement amount of the focal plane. Also, the more the optical resolution of a 3-D image is to be increased, i.e., the more the numerical aperture of the objective is to be increased by reducing the thickness of the light sheet, the greater the influence caused by this difference becomes because the shallower the focal depth is.

U.S. Unexamined Patent Application Publication No 2015/0286042 and International Publication Pamphlet No. WO 2015/184124 above disclose a technique that performs calibration by using the observation target before observation so as to generate data for correcting a difference of the focal plane of the objective. Using this technique can suppress a difference between the focal plane of the objective and the light sheet plane to some extent.

However, when the refractive index of a sample has a steep change inside or other cases, it is difficult to suppress differences with sufficient accuracy. By obtaining more images in calibration, it is possible to improve the correction accuracy. However, obtaining more images takes a longer time for calibration. Also, there is a risk that calibration may damage the sample.

Hereinafter, an embodiment of the present invention will be described.

First Embodiment

Figure 1:
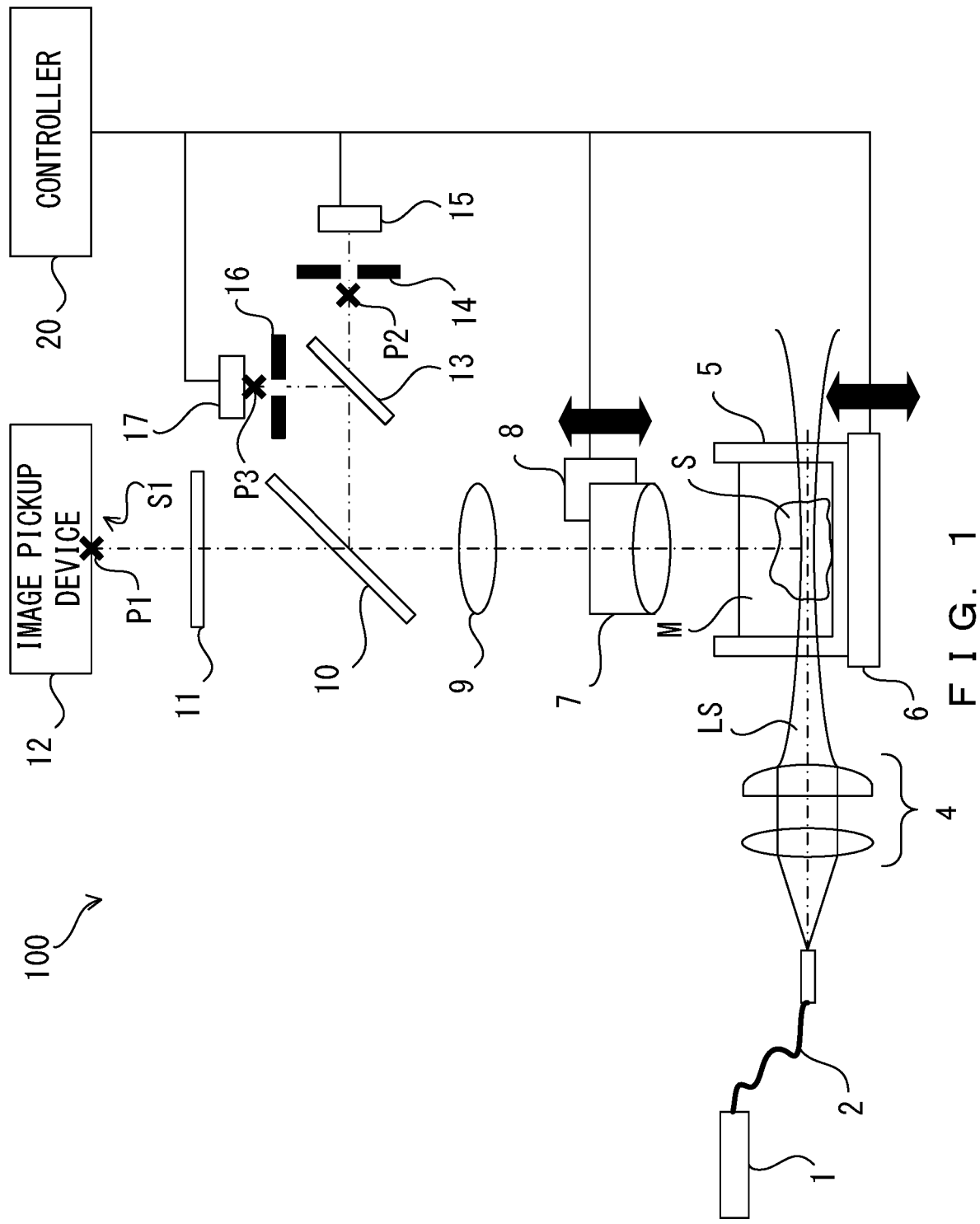
FIG. 1 exemplifies a configuration of a light sheet microscope 100 according to the first embodiment.

FIG. 1 exemplifies a configuration of a light sheet microscope 100 according to the present embodiment. The light sheet microscope 100 is a apparatus that obtains a cross-sectional image of sample S immersed in medium M such as culture solution, transparentization solution, etc. Sample S is for example a biological cell that was labeled by fluorochrome. Sample S is contained in for example a sample container 5 such as a cuvette etc. mounted on a stage 6.

The light sheet microscope 100 includes a laser 1, an optical fiber 2, a light sheet illumination optical system 4, the stage 6, a dry objective 7, Z drive unit 8, a tube lens 9, a dichroic mirror 10, an emission filter 11 and an image pickup device 12.

The light sheet illumination optical system 4 includes for example a collector lens and a cylindrical lens, and irradiates sample S with a light sheet from a direction different from the optical axis direction of the objective 7. More specifically, the light sheet illumination optical system 4 is arranged so that the emission optical axis of the light sheet illumination optical system 4 is roughly orthogonal to the optical axis of the objective 7. The light sheet illumination optical system 4 is configured to irradiate sample S with light sheet LS from a direction that is roughly orthogonal to the optical axis of the objective 7. In this example, a light sheet is illumination light that forms a sheet-shaped illumination area. Light sheet LS has a sheet-like shape that is thin in the optical axis directions of the objective 7 in sample S. Also, "roughly orthogonal" refers to a range that may be considered by those skilled in the art as an error in setting or manufacturing from the orthogonal state.

The stage 6 is an electric stage that moves in the optical axis directions of the objective 7. The stage 6 is second adjustor that adjusts the relative position (i.e. relative distance) between a light sheet plane and sample S in the optical axis directions of the objective 7. The movement of the stage 6 is controlled by a controller 20, which will be explained later.

The Z drive unit 8 is an electric unit that moves the objective 7 in the optical axis directions of the objective 7. The Z drive unit 8 is first adjustor that adjusts the relative position (i.e. relative distance) between a light sheet plane on which light sheet LS is formed and the objective 7 in the optical axis directions of the objective 7. Movements of the objective 7 via the Z drive unit 8 are controlled by the controller 20, which will be described later.

The dichroic mirror 10 reflects a laser beam so as to split the beam into a laser beam and fluorescence. The emission filter 11 shields a laser beam and transmits fluorescence. The dichroic mirror 10 and the emission filter 11 limit the entrance of a laser beam to the image pickup device 12.

The image pickup device 12 obtains, via the objective 7, an image of sample S that is irradiated with light sheet LS. The image pickup device 12 is for example a digital camera having a 2-D image sensor such as a CCD (Charge Coupled Device, a CMOS (Complementary Metal Oxide Semiconductor), etc. The image pickup device 12 has light-receiving surface S1, and is arranged in such a manner that the front-side focal position of the objective 7 is projected on the light-receiving surface S1. Position P1 on light-receiving surface S1 shown in FIG. 1 is the position at which the front-side focal position of the objective 7 is projected, i.e., the position that is optically conjugate with the front-side focal position of the objective 7.

The light sheet microscope 100 further includes a beam splitter 13, two light shielding plates (pinhole plates 14 and 16) and two photodetectors (photodetectors 15 and 17) in the reflection optical path of the dichroic mirror 10 (the optical path branching, by the dichroic mirror 10, from the optical path between the image pickup device 12 and the objective 7).

The beam splitter 13 splits the laser beam reflected by the dichroic mirror 10 at a ratio of 50:50. The pinhole plate 14 and the photodetector 15 are arranged in one of the optical paths branched by the beam splitter 13. The pinhole plate 16 and the photodetector 17 are arranged on the other of the optical paths branched by the beam splitter 13.

The pinhole plate 14 is a first light shielding plate having an opening, and is arranged on the far side of position P2 at which the front-side focal position of the objective 7 is projected. The pinhole plate 16 is a second light shielding plate having an opening, and is arranged on the near side of position P3 at which the front-side focal position of the objective 7 is projected. Positions P2 and P3 are positions that are optically conjugate with the front-side focal position of the objective 7, and are, in other words, positions corresponding to the light-receiving surface S1 (position P1) of the image pickup device 12. Hereinafter, positions P2 and P3 may respectively be referred to also as reference positions, as necessary. In this example, "near side" means a near side with respect to the traveling direction of the light, and "far side" means a far side with respect to the traveling direction of the light.

The photodetector 15 is a first photodetector that detects light that is from the light sheet plane and that passed through the pinhole plate 14, and detects a laser beam in a dedicated manner. The photodetector 17 is a second photodetector that detects light that is from the light sheet plane and that passed through the pinhole plate 16, and detects a laser beam in a dedicated manner. The photodetector 15 and the photodetector 17 are for example Photomultiplier Tubes (PMTs), and output a signal in accordance with a detected light amount.

The light sheet microscope 100 further includes the controller 20. The controller 20 is configured to perform a cross-sectional image obtainment process for obtaining a plurality of cross-sectional images of sample S. The outline of the cross-sectional image obtainment process is as below, although this process will be described later in detail.

In the cross-sectional image obtainment process, the controller 20 varies the relative position between the light sheet plane and the sample S by controlling the stage 6 in order to obtain a plurality of cross-sectional images by irradiating different positions of sample S with a light sheet. Then, the refractive-index distribution in the medium between the light sheet plane and the objective 7 (including the air, medium M and the inside of sample S) varies. This moves the focal plane of the objective 7 in the optical axis directions even when the objective is not moved. Because of this, just controlling the stage 6 results in a difference between a light sheet plane and the focal plane of the objective. Thus, after controlling the stage 6, the controller 20 further controls the Z drive unit 8 on the basis of the light that is from the light sheet plane and that is detected via the objective 7, and adjusts the relative position between the light sheet plane and the objective 7. More specifically, the Z drive unit 8 is controlled so that the focal plane of the objective 7 is made closer to the light sheet plane and thereby these positions coincide. Thereby, it is possible to obtain a plurality of cross-sectional images with the focal plane of the objective 7 and the light sheet plane coinciding highly accurately.

Figure 2:
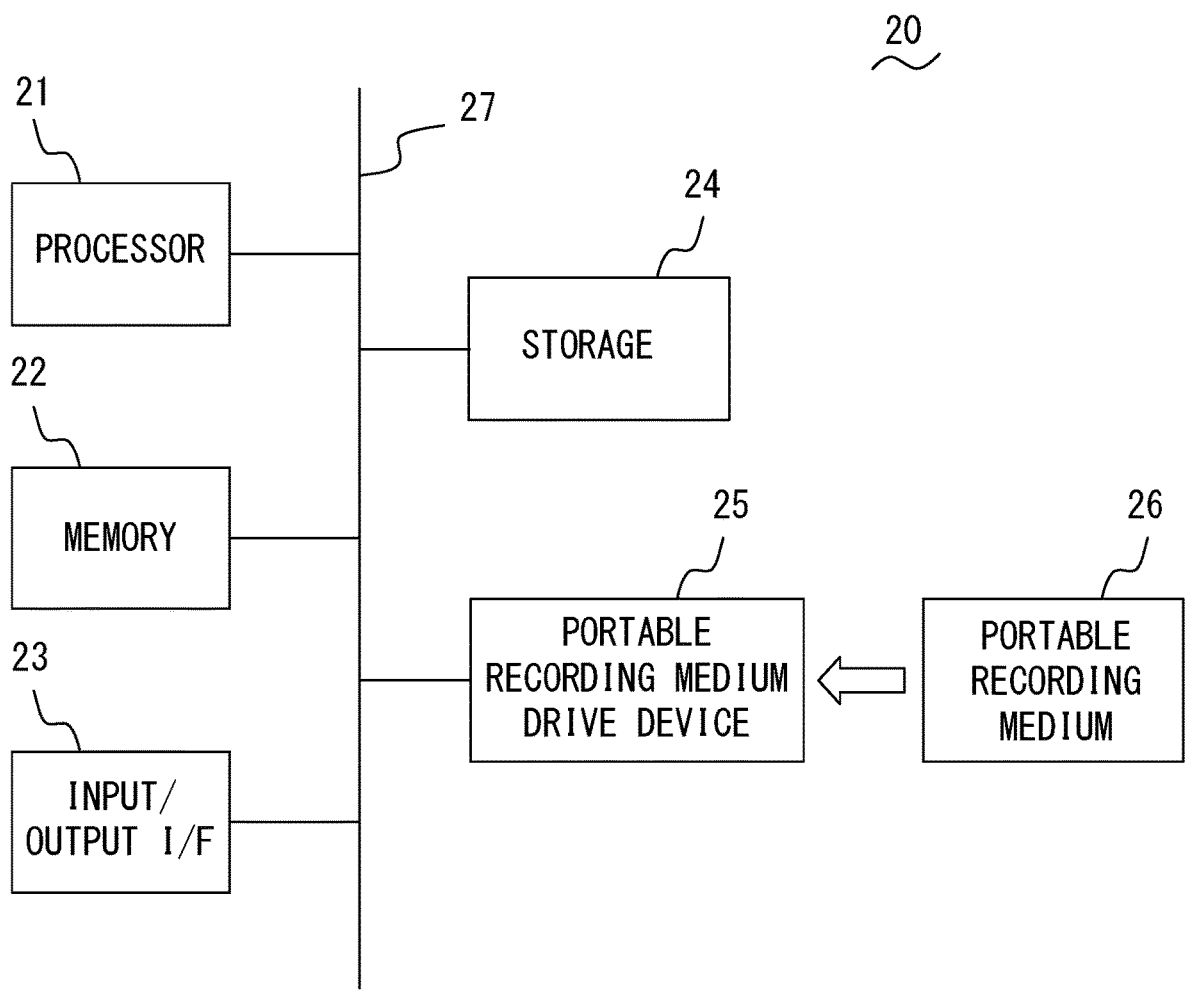
FIG. 2 exemplifies a configuration of hardware of a controller 20.

FIG. 2 exemplifies a configuration of hardware of the controller 20. The controller 20 is for example a standard computer, and includes a processor 21, a memory 22, an input/output interface 23, a storage 24 and a portable recording medium drive device 25 into which a portable recording medium 26 is inserted. They are connected to each other via a bus 27. Note that FIG. 2 shows an example of the hardware configuration of the controller 20, and the controller 20 is not limited to this configuration.

The processor 21 is for example a CPU (Central Processing Unit), an MPU (Micro Processing Unit) a DSP (Digital Signal Processor), etc. The processor 21 executes a program so as to perform the programmed process such as the cross-sectional image obtainment process described above. The memory 22 is for example a RAM (Random Access Memory). When a program is to be executed, the memory 22 temporarily stores the program or data that are recorded in the storage 24 or the portable recording medium 26.

The input/output interface 23 is a circuit that exchanges a signal with devices other than the controller 20 (for example the stage 6, the Z drive unit 8, the photodetector 15, the photodetector 17, etc.). The storage 24 is for example a hard disk, a flash memory, and is used mainly for recording various types of data and programs. The portable recording medium drive device 25 accommodates the portable recording medium 26 such as an optical disk, a CompactFlash (registered trademark), etc. The portable recording medium 26 plays a role of assisting the storage 24.

Figure 3:
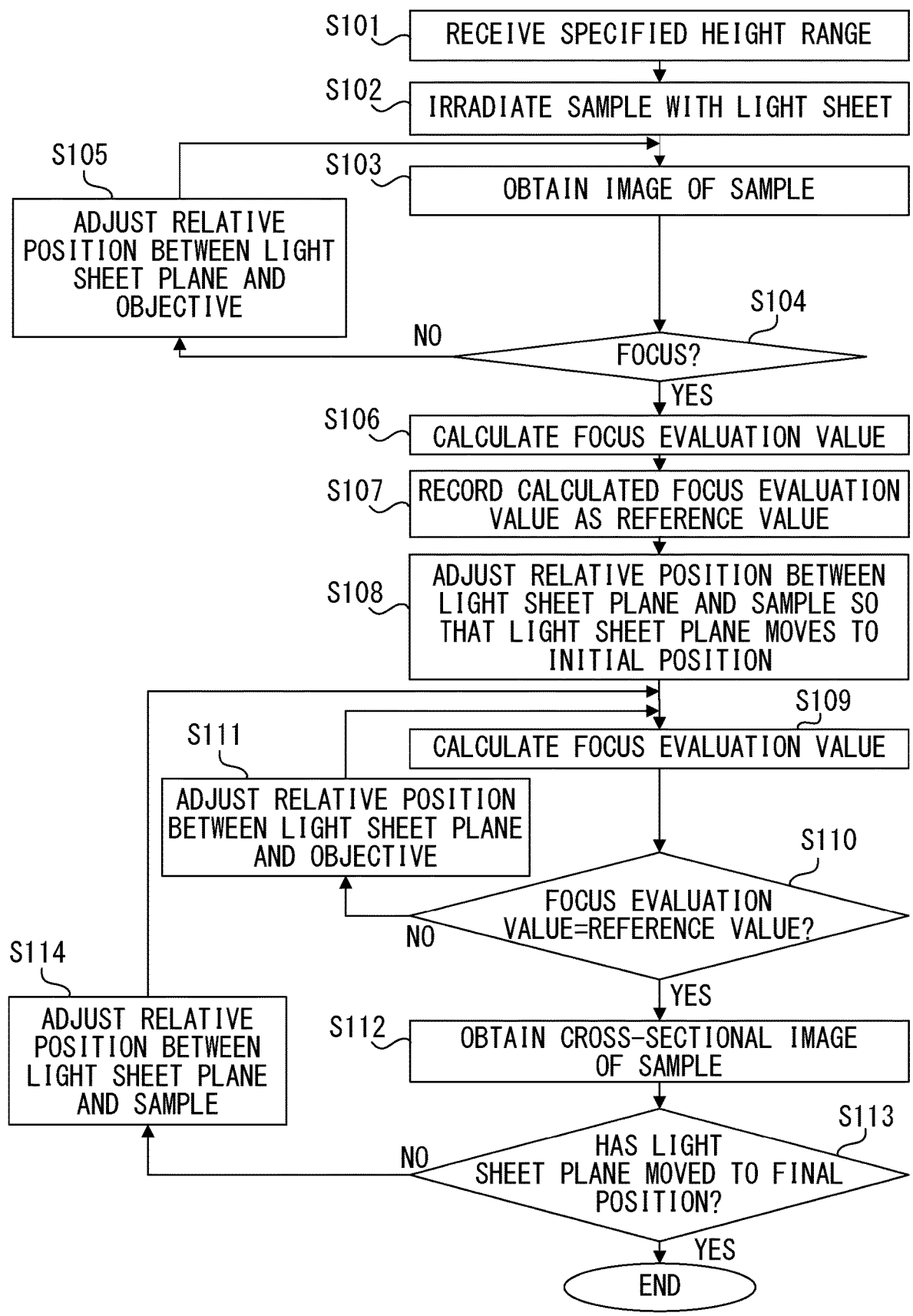
FIG. 3 is a flowchart showing procedures of a cross-sectional image obtainment process according to the first embodiment.

FIG. 3 is a flowchart showing procedures of a cross-sectional image obtainment process. Hereinafter, while referring to FIG. 3, specific explanations will be given for a cross-sectional image obtainment process performed by the light sheet microscope 100.

The light sheet microscope 100 first receives specifying of a height range in which cross-sectional images are obtained (step S101). In this example, when the user uses an input device (not shown) so as to input a height range in which cross-sectional images are obtained, the controller 20 receives the specified height range. The controller 20 further determines, on the basis of the received height range, the position at which cross-sectional images are obtained, i.e., the position of the light sheet plane in sample S.

Next, the light sheet microscope 100 irradiates sample S with light sheet LS (step S102), and obtains an image of sample S (step S103). In this example, the position of the light sheet plane in sample S is not limited particularly. Accordingly, it is possible to irradiate an arbitrary position with light sheet LS so as to obtain an image of sample S, i.e., an image of a light sheet plane by using the image pickup device 12.

Thereafter, the light sheet microscope 100 makes a focus determination on the basis of the obtained image (step S104). In the determination, whether or not the focal plane of the objective 7 coincides with the light sheet plane is determined by for example the controller 20 on the basis of the contrast of the image. It is also possible to make a determination by a human checking the image visually instead of the controller 20 making the determination so that the controller 20 makes a determination of whether or not the state is a focus state on the basis of the determination state.

When the state is determined to be not a focus state (NO in step S104), the light sheet microscope 100 adjusts the relative position between the light sheet plane and the objective 7 in the optical axis directions of the objective 7 (step S105). In this example, the controller 20 controls the Z drive unit 8 so as to adjust the relative position between the light sheet plane and the objective 7. Thereafter, an image of sample S is again obtained (step S103). Thereafter, until the state is determined to be a focus state (YES in step S104), the processes in step S103 through step S105 are repeated. Note that this focus determination process does not have to be performed on an entire image that has been obtained. It may be performed on part of an image obtained by using an image pickup element of the image pickup device 12.

When the state is determined to be a focus state, the light sheet microscope 100 calculates a focus evaluation value (step S106). In this example, the controller 20 performs a prescribed computation on the basis of output signals from the photodetector 15 and the photodetector 17 that detected a laser beam scattered on the light sheet plane, and thereby a focus evaluation value is calculated. A focus evaluation value is a value that varies in accordance with a degree to which the focal plane of the objective 7 and the light sheet plane coincide. A focus evaluation value is calculated from for example $(A-B)/(A+B)$, where A represents an output signal value from the photodetector 15 and B represents an output signal value from the photodetector 17 although this example is not limitative particularly.

Thereafter, the light sheet microscope 100 records the value calculated in step S106, as a reference value (step S107). A value calculated in step S106 is a focus evaluation value calculated in a focus state. Whether or not the state is a focus state can be determined on the basis of whether or not the focus evaluation value is equal to the value calculated in step S106. Thus, in step S107, the value calculated in step S106 is recorded as a reference value so as to use the value in a step that will be described later.

Next, the light sheet microscope 100 adjusts the relative position between the light sheet plane and sample S in the optical axis directions of the objective 7 so that the light sheet plane moves to the initial position (step S108). In this example, the controller 20 controls the stage 6 to move the light sheet plane to the initial position, which is one of positions, determined in step S101, at which cross-sectional images are obtained.

Thereafter, the light sheet microscope 100 calculates a focus evaluation value (step S109), and determines whether or not the focus evaluation value is substantially equal to the reference value recorded in step S107 (step S110). This process is performed because there is a possibility that the movement of the stage 6 in step S108 may have moved the focal plane of the objective 7. Note that the process in step S110 is similar to that of step S104 in that a focus determination is made. However, the process in step S110 is different in that a focus determination is made on the basis of output signals from the photodetector 15 and the photodetector 17 from that of step S104, in which a focus determination is made on the basis of an image obtained by the image pickup device 12. Also, the controller 20 may determine that a focus evaluation value is substantially equal to the reference value when the focus evaluation value is in a prescribed range including the reference value.

When a focus evaluation value is determined to be not equal to the reference value in step S110 (NO in step S110), the light sheet microscope 100 adjusts the relative position between the light sheet plane and the objective in the optical axis directions of the objective 7 (step S111). In this example, the controller 20 controls the Z drive unit 8 so that the focus evaluation value becomes closer to the reference value, and thereby adjusts the relative position between the light sheet plane and the objective 7.

The light sheet microscope 100 calculates a focus evaluation value again (step S109). Thereafter, until the focus evaluation value is determined to be substantially equal to the reference value, i.e., until the focus evaluation value becomes a value that is in a prescribed range including the reference value (YES in step S110), the processes in step S109 through step S111 are repeated. In other words, the controller 20 controls the Z drive unit 8 on the basis of an output signal from the photodetector 15 and an output signal from the photodetector 17 in step S109 through step S111.

When the focus evaluation value is determined to be substantially equal to the reference value (YES in step S110), the light sheet microscope 100 obtains a cross-sectional image of sample S (step S112). Thereby, a cross-sectional image is obtained with the focal plane of the objective 7 and the light sheet plane coinciding.

Thereafter, the light sheet microscope 100 determines whether or not the light sheet plane has moved to the final position (step S113). In this example, the controller 20 determines whether or not the light sheet plane has moved to the final position, which is one of positions, determined in step S101, at which cross-sectional images are obtained.

When determining that the light sheet plane has not moved to the final position, the light sheet microscope 100 adjusts the relative position between the light sheet plane and sample S in the optical axis directions of the objective 7 (step S114). In this example, the controller 20 controls the stage 6 to move the light sheet plane to a different position from among positions, determined in step S101, at which cross-sectional images are obtained. Thereafter, the light sheet microscope 100 repeats the processes from step S109 through step S114, and, when it is determined in step S113 that the light sheet plane has moved to the final position, the light sheet microscope 100 terminates the cross-sectional image obtainment process shown in FIG. 3.

In the light sheet microscope 100, a focus state is determined on the basis of an output signal from a photodetector that is obtained after changing the relative position between the light sheet plane and sample S. This makes it possible to make the light sheet plane coincide with the focal plane of the objective 7 more swiftly than in a case when a focus state is determined by a human on the basis of an image. The calculation amount is smaller even than a case when a focus state is determined by a controller on the basis of an image, making it possible to swiftly make the light sheet plane coincide with the focal plane of the objective 7.

Also, in the light sheet microscope 100, combinations of two detectors and two pinhole plates make it possible to discriminate between a state in which the focus is on a point closer to the lens than the intended point and a state in which the focus is on a point farther from the lens than the intended point. This makes it possible to learn a direction in which a difference has been caused between the focal plane of the objective 7 and the light sheet plane so as to determine the direction in which the relative position between the light sheet plane and the objective is to be adjusted. This point as well contributes to making the light sheet plane coincide with the focal plane of the objective 7 swiftly.

Further, in the light sheet microscope 100, each time the relative position between the light sheet plane and sample S is changed, a focus process is performed on the basis of a signal detected actually at that relative position. This make it possible to make the light sheet plane coincide with the focal plane of the objective 7 more highly accurately than in a case when a focus process is performed on the basis of calibration data.

As described above, the light sheet microscope 100 makes it possible to make the focal plane of an objective coincide with a light sheet plane highly accurately and swiftly. Note that while the present embodiment has only explained a case when sample S has been moved in the optical axis directions of the objective 7, it is necessary to move the sheet light in the directions of the illumination optical axis to pick up an image when sample S is large. In the above situation, while there is a possibility that the refractive index varies depending upon the position of sample S to shift the focal plane of the objective 7, it is possible to bring the light sheet plane into focus by using the present method even in such a case. Also, while an example where the controller 20 calculates a focus evaluation value through a software process so as to control the Z drive unit 8 has been shown for the light sheet microscope 100, it is also possible to evaluate a focus evaluation value by using for example a circuit such as a comparator etc. instead of the controller 20 so as to output a control signal in accordance with the evaluation result to the Z drive unit 8. In such a case, a focus process can be performed further faster than a software process. Also, while an example where the pinhole plates 14 and 16 are included has been shown for the light sheet microscope 100, a light shielding plate 18 having for example the pinhole array 19 shown in FIG. 4 may be included instead of each of the pinhole plates 14 and 16. Using the light shielding plate 18 makes it possible to detect light from many points in sample S. This can reduce influence caused by an exceptional point (location with a little scattering) in sample S, making it possible to obtain a focus determination result that is more reliable.

Second Embodiment

Figure 5:
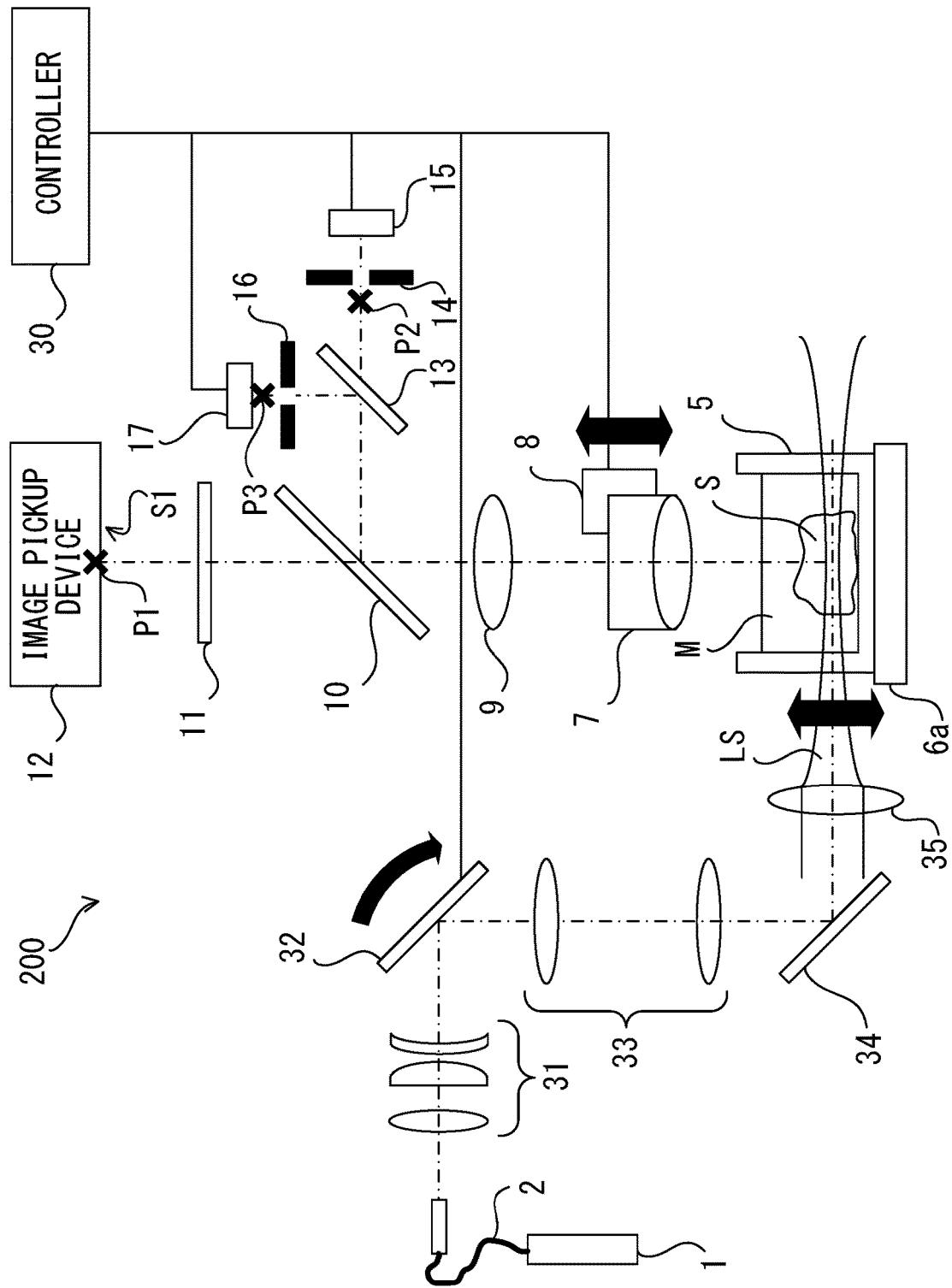
FIG. 5 exemplifies a configuration of a light sheet microscope 200 according to the second embodiment.

FIG. 5 exemplifies a configuration of a light sheet microscope 200 according to the present embodiment. The light sheet microscope 200 is different from the light sheet microscope 100 in that it includes a light sheet illumination optical system 31, a scan mirror 32, a relay optical system 33, a mirror 34 and a scan lens 35 instead of the light sheet illumination optical system 4 and that it includes a stage 6a and a controller 30 instead of the stage 6 and the controller 20, respectively. The other points are similar to those of the light sheet microscope 100.

In the light sheet microscope 200, sample S is irradiated with a light sheet formed by the light sheet illumination optical system 31 via the scan mirror 32, the relay optical system 33, the mirror 34 and the scan lens 35 from a direction that is roughly orthogonal to the optical axis of the objective 7. Also, changing the swing angle of the scan mirror 32 moves light sheet LS with which sample S is irradiated, in the optical axis directions of the objective 7. Accordingly, in the light sheet microscope 200, the scan mirror 32 is second adjustor that adjusts the relative position between the light sheet plane and sample S in the optical axis directions of the objective 7. The swing angle of the scan mirror 32 is controlled by the controller 30. Thus, the stage 6a does not have to be an electric stage that can be controlled by the controller 30.

While the controller 30 is different from the controller 20 in that it is connected to the scan mirror 32 instead of the stage 6, the hardware of the controller 30 is similar to that of the controller 20. Also, the controller 30 is similar to the controller 20 also in that it is configured to perform the cross-sectional image obtainment process shown in FIG. 3, in which a plurality of cross-sectional images of sample S are obtained. However, the controller 30 adjusts the relative position between the light sheet plane and the sample S by controlling the scan mirror 32 (step S108 and step S114), which is different from the controller 20.

The light sheet microscope 200 as well can make the focal plane of the objective coincide with the light sheet plane swiftly and highly accurately, similarly to the light sheet microscope 100. Also, the light sheet microscope 200 makes it possible to change the relative position between the light sheet plane and sample S without moving sample S. This makes it possible to obtain a plurality of cross-sectional images so as to generate a 3-D image without giving stimulation (for example a change in acceleration etc.) caused by movement of sample S.

Third Embodiment

Figure 6:
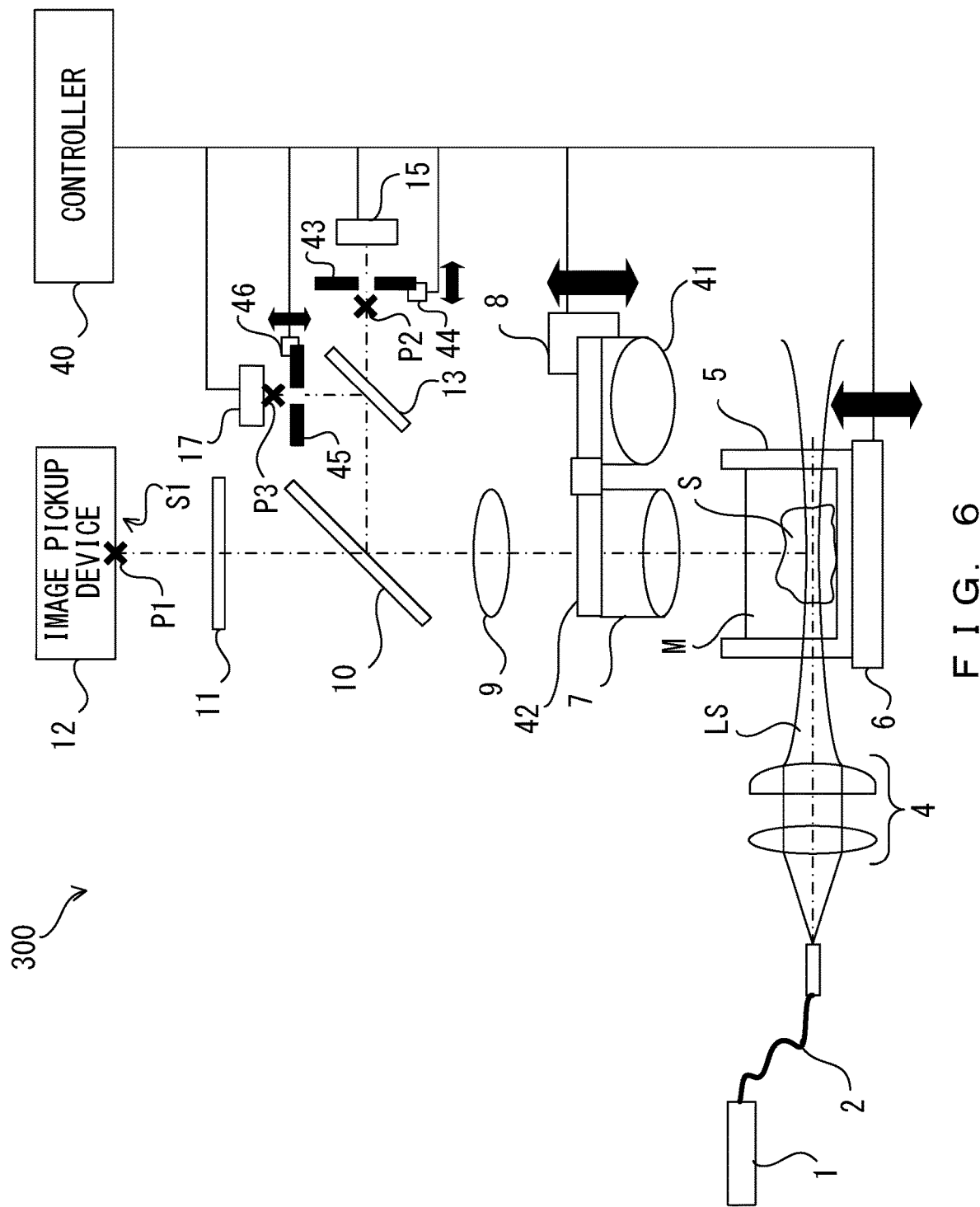
FIG. 6 exemplifies a configuration of a light sheet microscope 300 according to the third embodiment.

FIG. 6 exemplifies a configuration of a light sheet microscope 300 according to the present embodiment. The light sheet microscope 300 is different from the light sheet microscope 100 in that a plurality of objectives (objectives 7 and 41) having different magnifications are mounted on a revolver 42, that two light shielding plates (pinhole plates 43 and 45) are provided in such a manner that they can move along the optical path so that the distance from reference positions (positions P2 and P3) varies, that two drive mechanisms (drive mechanisms 44 and 46) that move the two light shielding plates along the optical path are provided and that a controller 40 is provided instead of the controller 20. The other points are similar to those of the light sheet microscope 100.

The drive mechanisms 44 and 46 are third adjustor that adjusts the positions of the pinhole plates 43 and 45, and movements of the pinhole plates 43 and 45 via the drive mechanisms 44 and 46 are controlled by the controller 40.

The controller 40 is different from the controller 20 in that it is connected to the drive mechanisms 44 and 46. The hardware configuration of the controller 40 is similar to that of the controller 20. Also, the controller 40 performs the cross-sectional image obtainment process shown in FIG. 7 instead of the cross-sectional image obtainment process shown in FIG. 3.

Figure 7:
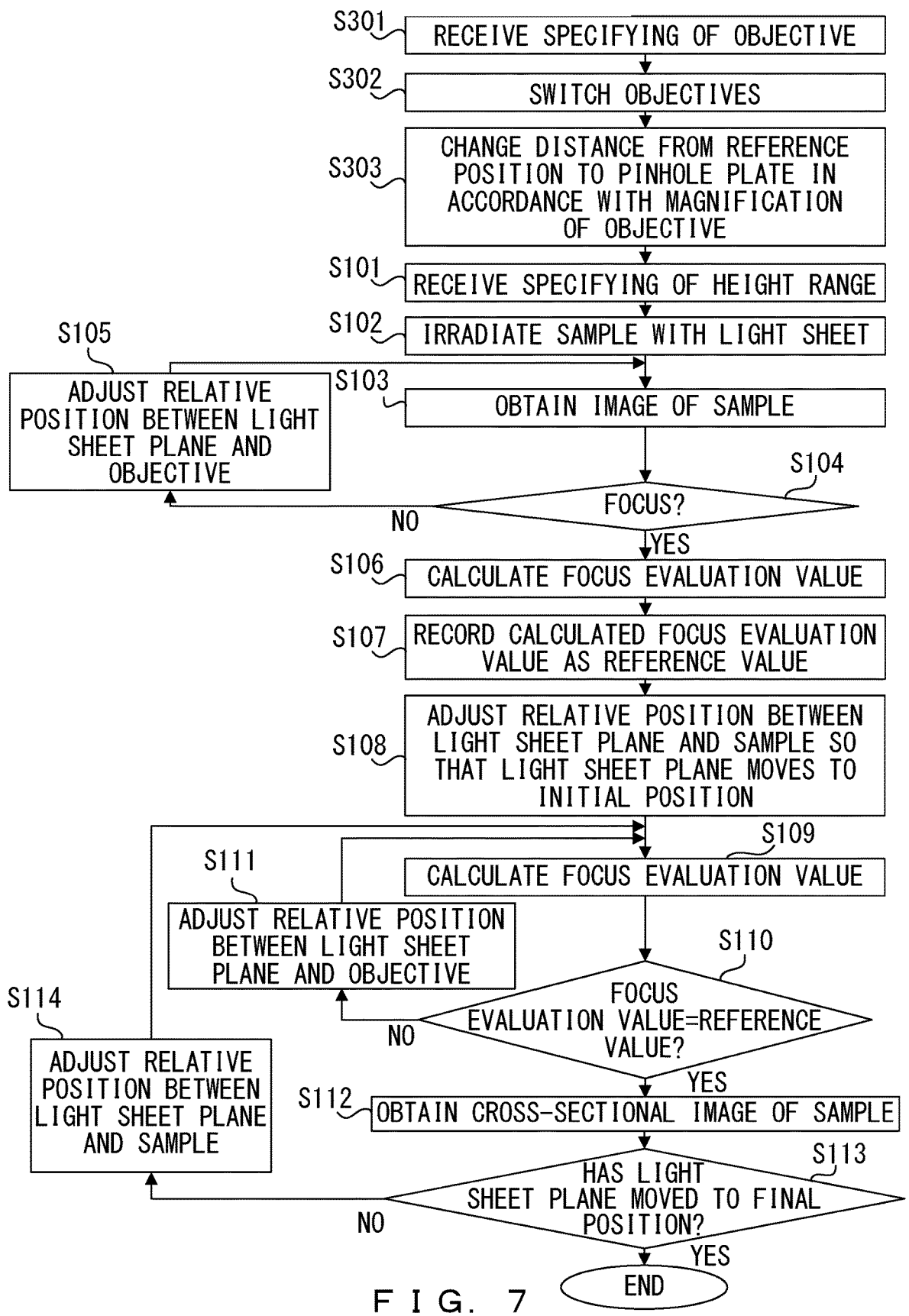
FIG. 7 is a flowchart showing procedures of a cross-sectional image obtainment process according to the third embodiment.

FIG. 7 is a flowchart showing procedures of a cross-sectional image obtainment process. Hereinafter, while referring to FIG. 7, specific explanations will be given for a cross-sectional image obtainment process performed by the light sheet microscope 300.

The light sheet microscope 300 first receives specifying of an objective that is to be used (step S301). In this example, when the user selects an objective by using an input device (not shown), the controller 40 receives specifying of the objective.

Thereafter, the light sheet microscope 300 switches to the specified objective (step S302). In this example, the controller 40 controls the revolver 42 so that the revolver 42 switches the objective arranged in the optical path to the selected objective.

When the objectives have been switched, the light sheet microscope 300 changes, in accordance with the magnification of the switched objective lens, the distances from the reference positions to the two pinhole plates (pinhole plates 43 and 45) (step S303). In this example, the controller 40 controls the drive mechanisms 44 and 46 in accordance with the magnification of the objective so as to adjust the positions of the two pinhole plates. More specifically, the positions of the two pinhole plates are adjusted in such a manner that the higher the magnification of the objective is, the more the two pinhole plates becomes distant from the reference positions. This is because the position at which the light sheet plane is projected (image position) changes on the basis of a magnitude obtained by multiplying the square of the magnification of the objective by the changing amount of the position of the light sheet plane.

Step S101 through step S114 that follow are similar to the cross-sectional image obtainment process, shown in FIG. 3, performed by the light sheet microscope 100.

The light sheet microscope 300 as well can make the focal plane of the objective coincide with the light sheet plane swiftly and highly accurately, similarly to the light sheet microscope 100. Also, the position of the light shielding plate is adjusted in accordance with the magnification of the objective, making it possible to perform a focus determination stably and without depending on the magnification. Further, by configuring the pinhole diameter in such a manner that the diameter can be varied and setting the optimum pinhole diameter for the objective that is to be inserted into the optical path, it is also possible to perform focusing with higher accuracy.

Fourth Embodiment

Figure 8:
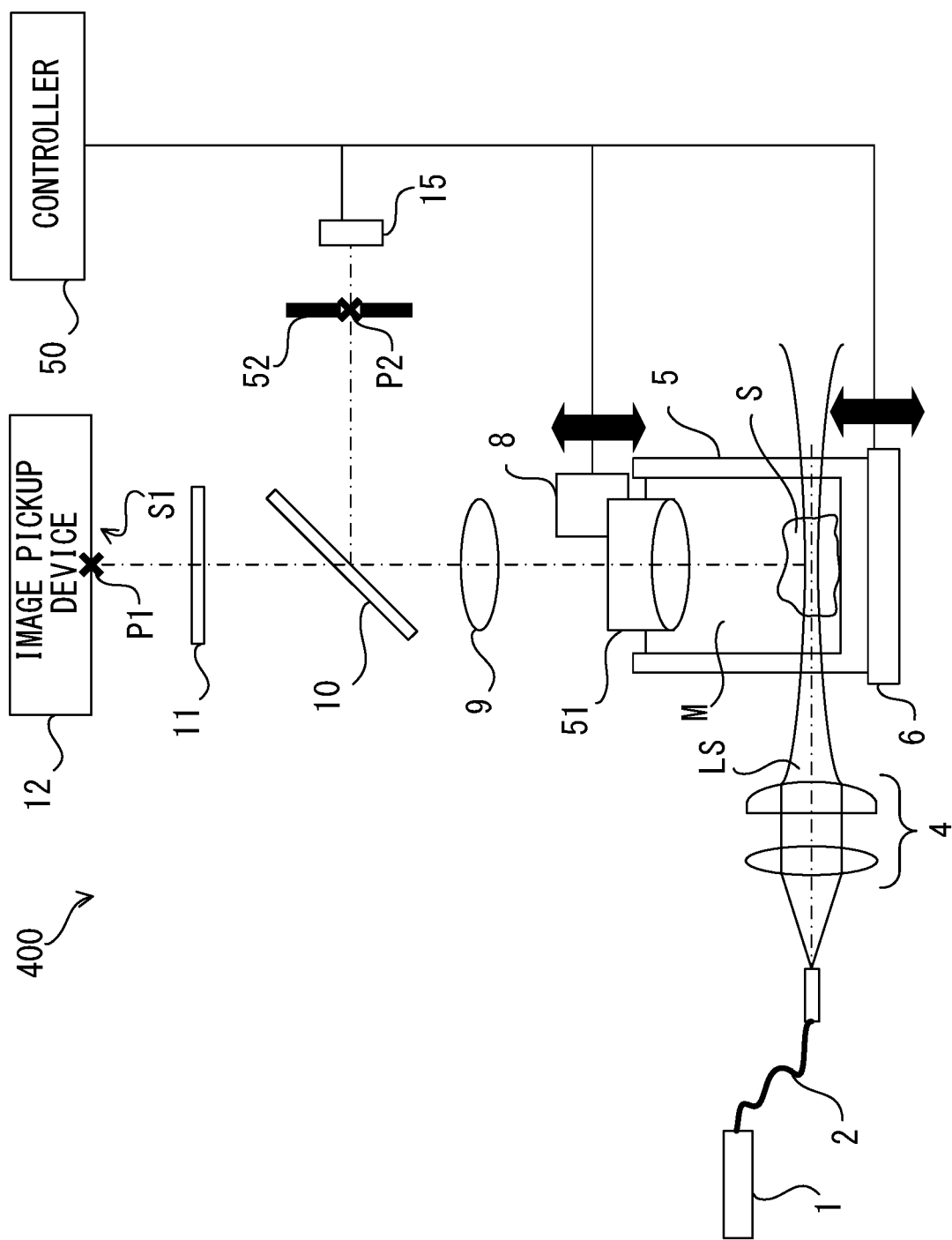
FIG. 8 exemplifies a configuration of a light sheet microscope 400 according to the fourth embodiment.

FIG. 8 exemplifies a configuration of a light sheet microscope 400 according to the present embodiment. The light sheet microscope 400 is different from the light sheet microscope 100 in that it includes an immersion objective 51 instead of the dry objective 7, that the beam splitter 13, the pinhole plate 16 and the photodetector 17 are omitted, that it includes a pinhole plate 52 instead of the pinhole plate 14 and that it includes a controller 50 instead of the controller 20. The other points are similar to those of the light sheet microscope 100.

The pinhole plate 52 is arranged at reference point P2, which corresponds to light-receiving surface S1. The controller 50 is different from the controller 20 in that it controls the Z drive unit 8 on the basis of an output signal from the photodetector 15 having detected light that is from the light sheet plane and that passed through the pinhole plate 52. The configuration of the controller 50 is similar to that of the controller 20. Also, the controller 50 performs the cross-sectional image obtainment process shown in FIG. 9 instead of the cross-sectional image obtainment process shown in FIG. 3.

Figure 9:
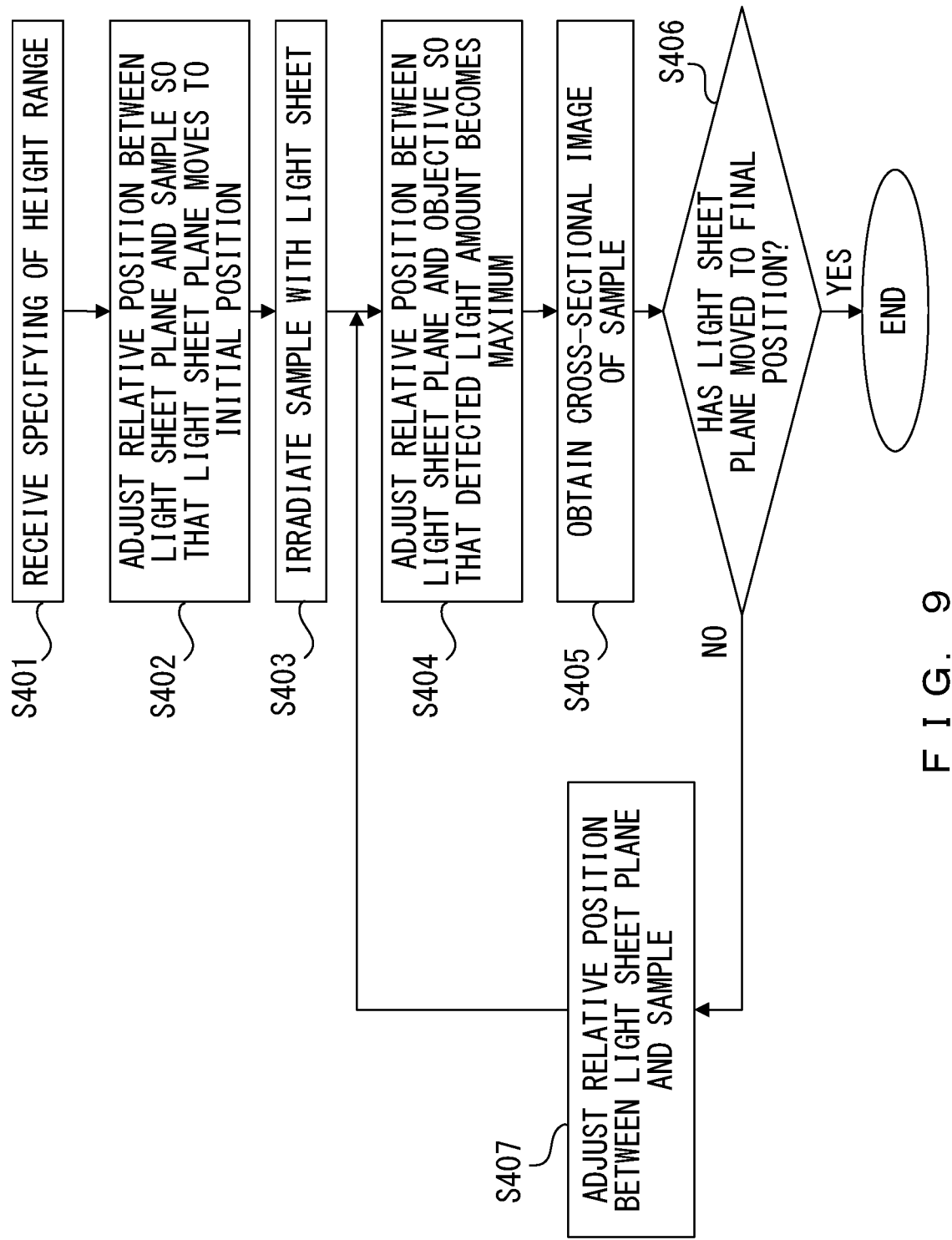
FIG. 9 is a flowchart showing procedures of a cross-sectional image obtainment process according to the fourth embodiment.

FIG. 9 is a flowchart showing procedures of a cross-sectional image obtainment process. Hereinafter, while referring to FIG. 9, specific explanations will be given for a cross-sectional image obtainment process performed by the light sheet microscope 400.

The light sheet microscope 400 first receives specifying of a height range in which cross-sectional images are obtained (step S401). This process is similar to that in step S101 of FIG. 3. In this example, the controller 50 determines, on the basis of the received height range, the position at which cross-sectional images are obtained, i.e., the position of the light sheet plane in sample S.

Next, the light sheet microscope 400 adjusts the relative position between the light sheet plane and sample S in the optical axis directions of the objective 51 so that the light sheet plane moves to the initial position (step S402). In this example, the controller 50 controls the stage 6 to move the light sheet plane to the initial position, which is one of positions, determined in step S401, at which cross-sectional images are obtained.

Further, the light sheet microscope 400 irradiates sample S with light sheet LS (step S403). Thereafter, the light sheet microscope 400 adjusts the relative position between the light sheet plane and the objective 51 in the optical axis directions of the objective 51 so that the detected light amount becomes maximum (step S404). In this example, the controller 50 repeats a process of controlling the Z drive unit 8 in such a manner that output signals from the photodetector 15 increase, and thereby determines the relative position that leads to the maximum detected light amount on the basis of output signals from the photodetector 15.

When the adjustment between the light sheet plane and the objective 51 is terminated, the light sheet microscope 400 obtains a cross-sectional image of sample S (step S405). Thereby, a cross-sectional image is obtained with the focal plane of the objective 51 and the light sheet plane coinciding.

Thereafter, the light sheet microscope 400 determines whether or not the light sheet plane has moved to the final position (step S406). In this example, the controller 50 determines whether or not the light sheet plane has moved to the final position, which is one of positions, determined in step S401, at which cross-sectional images are obtained.

When determining that the light sheet plane has not moved to the final position, the light sheet microscope 400 adjusts the relative position between the light sheet plane and sample Sin the optical axis directions of the objective 51 (step S407). In this example, the controller 50 controls the stage 6 to move the light sheet plane to a different position from among positions, determined in step S401, at which cross-sectional images are obtained. Thereafter, the light sheet microscope 400 repeats the processes from step S404 through step S407, and, when it is determined in step S406 that the light sheet plane has moved to the final position, the light sheet microscope 400 terminates the cross-sectional image obtainment process shown in FIG. 9.

The light sheet microscope 400 as well can make the focal plane of the objective coincide with the light sheet plane swiftly and highly accurately because a focus state is determined on the basis of an output signal, from an photodetector, that was actually output at each relative position. Also, the optical system has a configuration that is simpler than that of the light sheet microscope 100, making it possible to configure the device inexpensively. Further, when an immersion objective is used as in the present embodiment, an image can be obtained with a high resolution and a there is no air layer between the objective and the sample, leading to a smaller variation of the focal plane caused by a refractive-index difference, and accordingly the movement range of the objective (correction range) is small. This makes it possible to perform focus adjustment at a higher speed. Note that while the above embodiment uses an immersion objective, a dry objective may be used.

Fifth Embodiment

Figure 10:
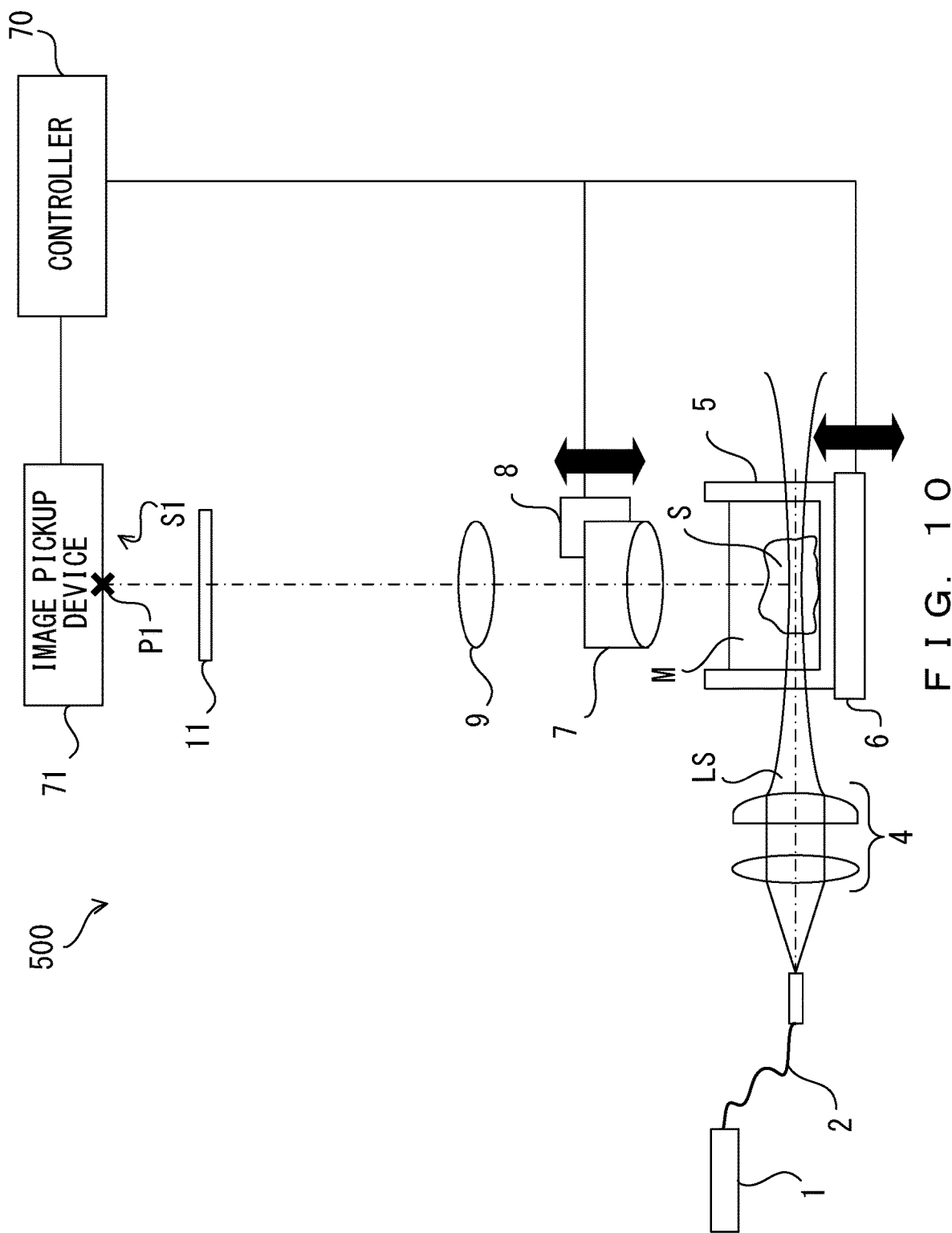
FIG. 10 exemplifies a configuration of a light sheet microscope 500 according to the fifth embodiment.
Figure 11:
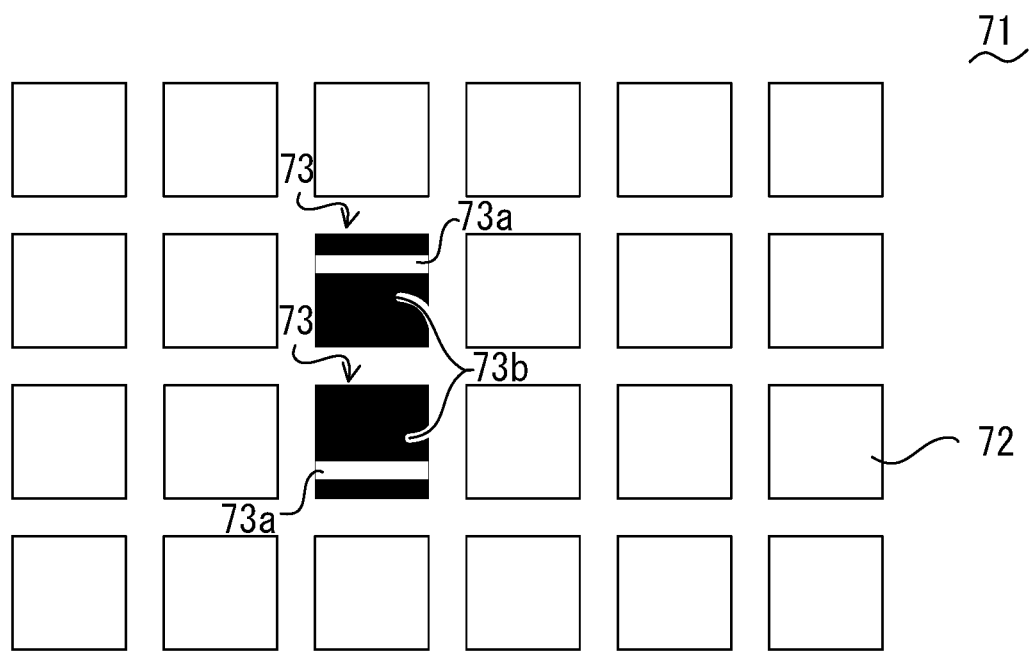
FIG. 11 exemplifies an array of pixels of an image pickup device 71.

FIG. 10 exemplifies a configuration of a light sheet microscope 500 according to the present embodiment. FIG. 11 exemplifies an array of pixels of an image pickup device 71 included in the light sheet microscope 500. The light sheet microscope 500 is different from the light sheet microscope 100 in that it includes an image pickup device 71 instead of the image pickup device 12, that the dichroic mirror 10, the beam splitter 13, the pinhole plate 14, the photodetector 15, the pinhole plate 16 and the photodetector 17 are omitted and that it includes a controller 70 instead of the controller 20. The other points are similar to those of the light sheet microscope 100.

The image pickup device 71 is an image pickup device that includes an image plane phase difference sensor, and is different from the image pickup device 12 in that it includes phase difference evaluation pixels 73 in addition to normal pixels 72 shown in FIG. 11. The phase difference evaluation pixel 73 includes a light shielding member 73b in which a slit 73a is formed. The phase difference evaluation pixels 73 include two types having different positions of the slits 73a in relation to the pixel centers, and pixels of the two types are used in pairs.

The controller 70 is different from the controller 20 in that it controls the Z drive unit 8 on the basis of an output signal from the phase difference evaluation pixel 73. The hardware configuration of the controller 70 is similar to that of the controller 20. Also, the controller 70 is similar to the controller 20 also in that it is configured to perform the cross-sectional image obtainment process shown in FIG. 3, in which a plurality of cross-sectional images of sample S are obtained. However, the controller 70 calculates a focus evaluation value and determines focus on the basis of an output signal from the phase difference evaluation pixel 73, differently from the controller 20.

The light sheet microscope 500 as well can make the focal plane of the objective coincide with the light sheet plane swiftly and highly accurately, similarly to the light sheet microscope 100 because it is possible to discriminate between a state in which the focus is on a point closer to the lens than the intended point and a state in which the focus is on a point farther from the lens than the intended point. Also, the optical system has a configuration that is simpler than that of the light sheet microscope 100, making it possible to configure the device inexpensively.

Sixth Embodiment

Figure 12:
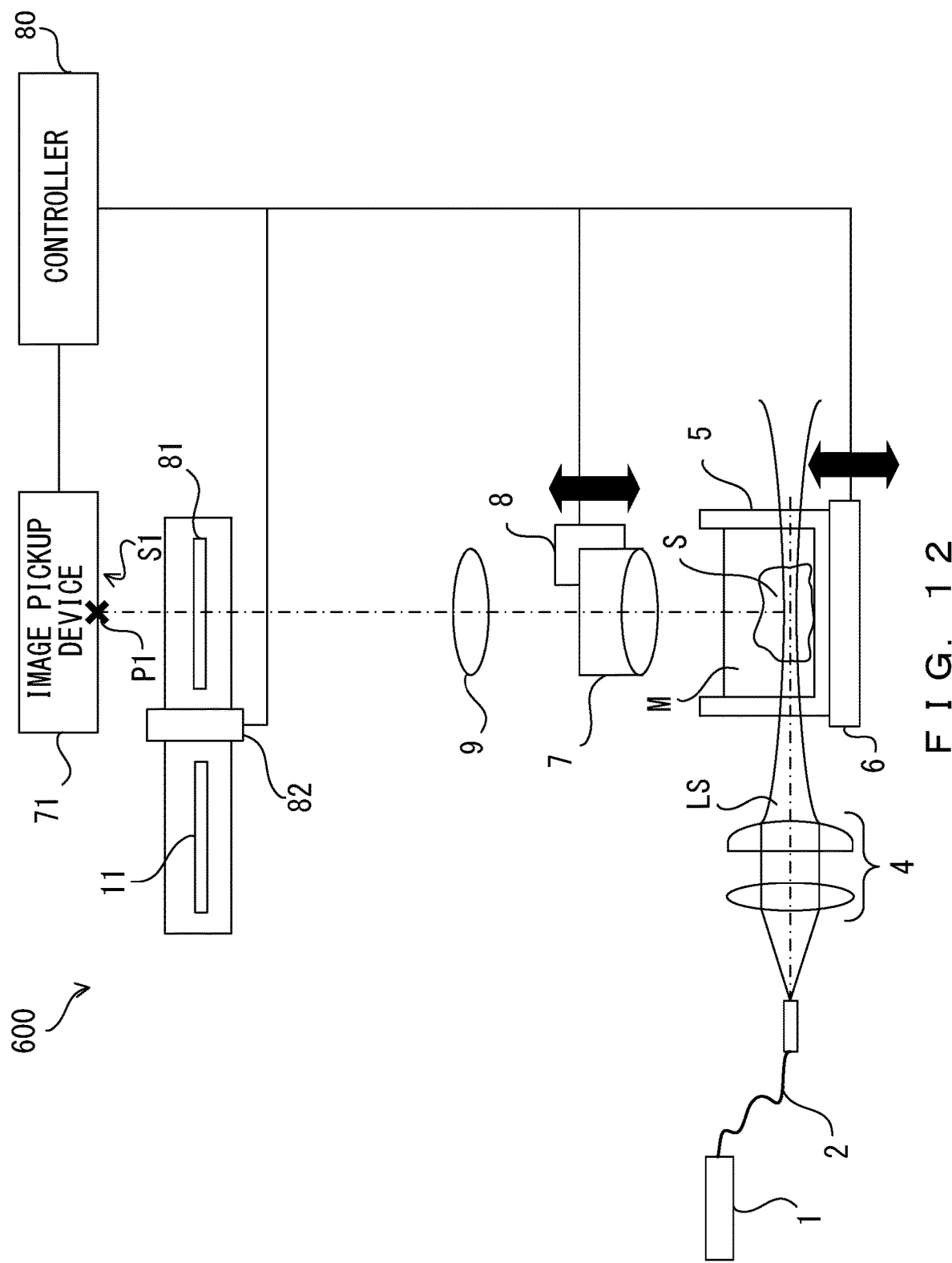
FIG. 12 exemplifies a configuration of a light sheet microscope 600 according to the sixth embodiment.

FIG. 12 exemplifies a configuration of a light sheet microscope 600 according to the present embodiment. The light sheet microscope 600 is different from the light sheet microscope 500 in that the emission filter 11 is accommodated in a filter turret 82 so that the emission filter 11 is used by being switched with a glass plate 81 and that a controller 80 is included instead of the controller 70. The other points are similar to those of the light sheet microscope 500.

The filter turret 82 is a device that switches the optical element arranged in the optical path between the emission filter 11 and the glass plate 81, and the switching operation is controlled by the controller 80. The glass plate 81 is a flat plate that transmits fluorescence and a laser beam, and the glass plate 81 has a thickness that results in a situation where the optical path length in that glass plate 81 is roughly equal to the optical path length in the emission filter 11.

The controller 80 is different from the controller 70 in that it is connected the filter turret 82, but the hardware configuration of the controller 80 is similar to that of the controller 70. Also, the controller 80 performs the cross-sectional image obtainment process shown in FIG. 13 instead of the cross-sectional image obtainment process shown in FIG. 3.

Figure 13:
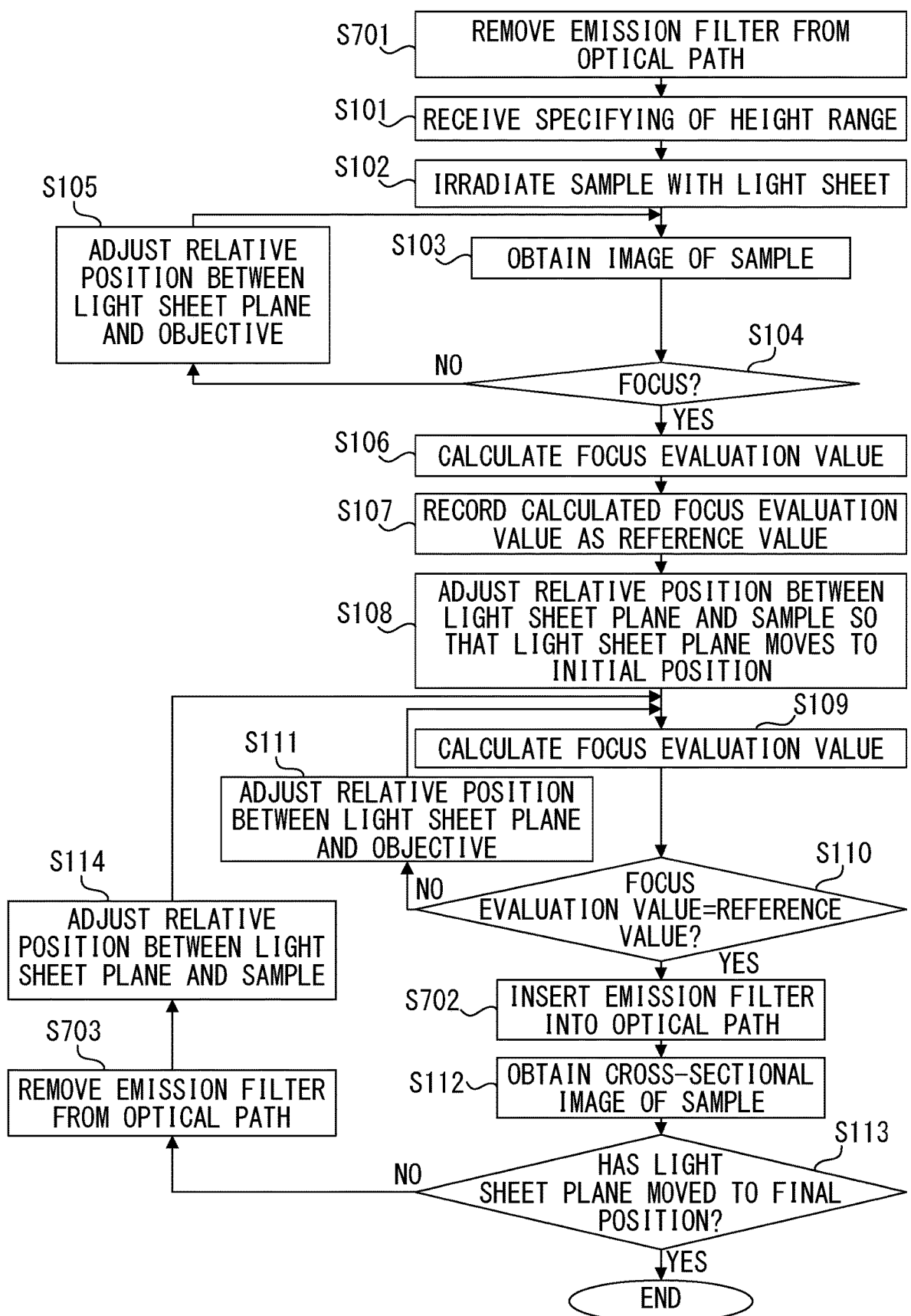
FIG. 13 is a flowchart showing procedures of a cross-sectional image obtainment process according to the sixth embodiment.

FIG. 13 is a flowchart showing procedures of a cross-sectional image obtainment process. Hereinafter, while referring to FIG. 13, specific explanations will be given for a cross-sectional image obtainment process performed by the light sheet microscope 600.

The light sheet microscope 600 first removes the emission filter 11 from the optical path (step S701). In this example, the controller 80 controls the rotation of the filter turret 82 so as to remove the emission filter 11 from the optical path and instead inserts the glass plate 81 into the optical path. Subsequent step S101 through step S111 are similar to those of the cross-sectional image obtainment process shown in FIG. 3 and performed by the light sheet microscope 100.

When the focus evaluation value is determined to be substantially equal to the reference value (YES in step S110), the light sheet microscope 600 inserts the emission filter 11 into the optical path (step S702). In this example, the controller 80 controls the rotation of the filter turret 82 so as to remove the glass plate 81 from the optical path and instead inserts the emission filter 11 into the optical path.

Thereafter, the light sheet microscope 600 obtains a cross-sectional image of sample S (step S112), and further determines whether or not the light sheet plane has moved to the final position (step S113).

When determining that the light sheet plane has not moved to the final position, the light sheet microscope 600 removes the emission filter 11 from the optical path (step S703), and thereafter adjusts the relative position between the light sheet plane and sample S in the optical axis direction of the objective 7 (step S114). Note that the process in step S703 is similar to that is step S701. Lastly, the light sheet microscope 600 repeats the processes from step S109 through step S114, and when it is determined in step S113 that the light sheet plane has moved to the final position, the light sheet microscope 600 terminates the cross-sectional image obtainment process shown in FIG. 13.

The light sheet microscope 600 as well can make the focal plane of the objective coincide with the light sheet plane swiftly and highly accurately, similarly to the light sheet microscope 100. Also, the optical system has a configuration that is simpler than that of the light sheet microscope 100, making it possible to configure the device inexpensively similarly to the light sheet microscope 500. Further, a focus determination process is performed with a laser beam entering the image pickup device 71. This makes it possible to perform a focus determination more stably than the light sheet microscope 500, in which a focus determination process is performed with only fluorescence, which is weaker than laser beams and is generated in different amounts depending upon the positions etc. in sample S, entering the image pickup device 71.

In the light sheet microscope 600, an example has been shown in which the emission filter 11 and the glass plate 81 are switched by the filter turret 82. However, a plurality of emission filters of different specifications may be accommodated in the filter turret 82, and emission filters may be switched depending upon the fluorescence wavelengths by using the filter turret 82. While an example in which a focus determination is performed with the glass plate 81 inserted into the optical path has been shown for the light sheet microscope 600, a focus determination may be conducted with a bandpass filter, which transmits only a laser beam, inserted into the optical path instead of the glass plate 81.

Seventh Embodiment

Figure 14:
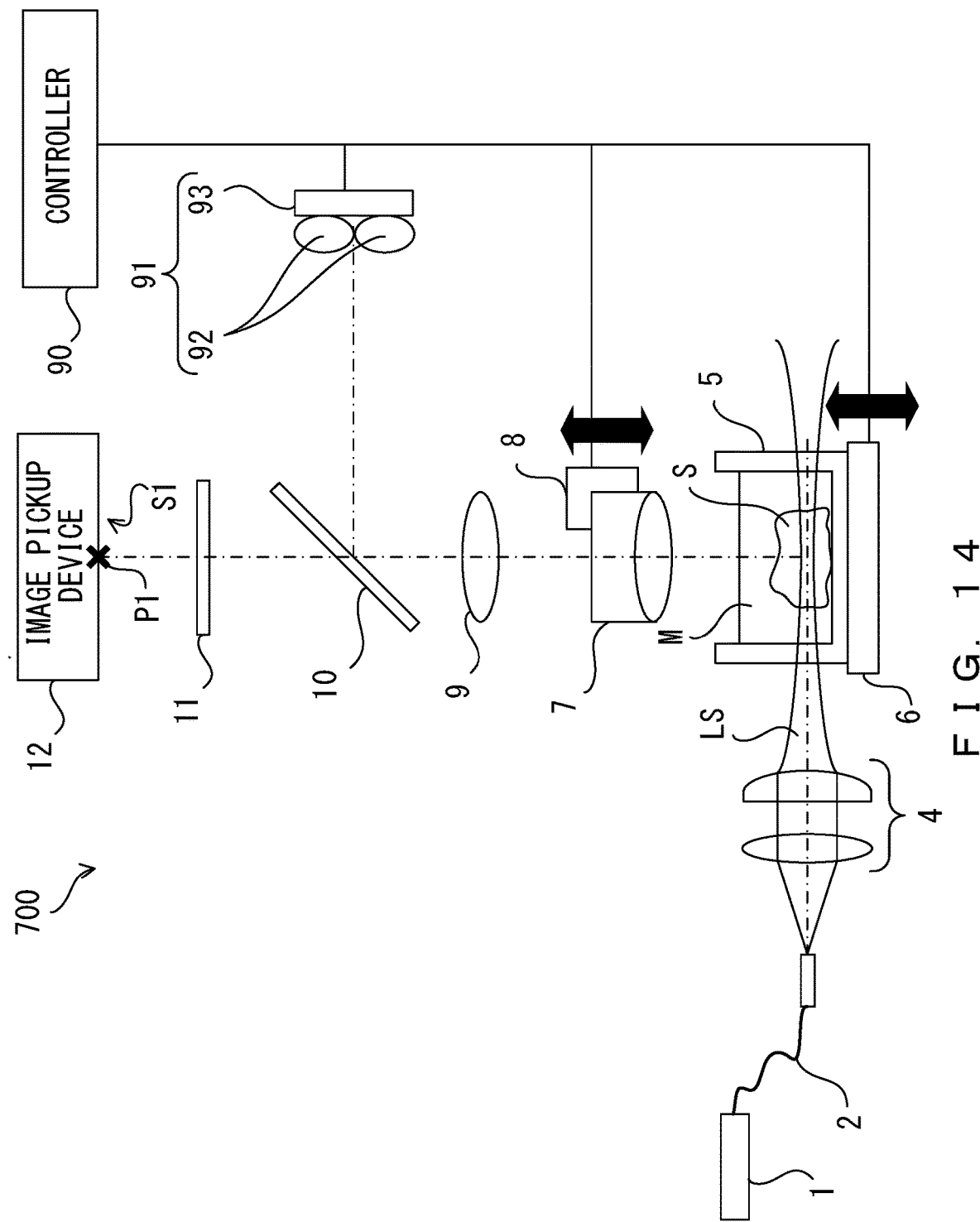
FIG. 14 exemplifies a configuration of a light sheet microscope 700 according to the seventh embodiment.

FIG. 14 exemplifies a configuration of a light sheet microscope 700 according to the present embodiment. The light sheet microscope 700 is different from the light sheet microscope 500 in that it includes the image pickup device 12 instead of the image pickup device 71, that it includes the dichroic mirror 10 and a phase difference auto focus (which will be referred to as "AF" hereinafter) sensor 91 and that it includes a controller 90 instead of the controller 70. The other points are similar to those of the light sheet microscope 500.

The phase difference AF sensor 91 is a sensor unit that includes a separator lens 92 and a sensor 93 and that performs a phase difference AF process, and is provided on the optical path branching from the optical path between the photodetector 12 and the objective 7. The phase difference AF sensor 91 functions substantially similarly to the image plane phase difference sensor provided in the image pickup device 71 of the light sheet microscope 500.

The controller 90 is different from the controller 70 in that it is connected to the phase difference AF sensor 91 and that it controls the Z drive unit 8 on the basis of an output signal from the phase difference AF sensor 91. The hardware configuration of the controller 90 is similar to that of the controller 70. Also, the controller 90 is similar to the controller 70 also in that it is configured to perform the cross-sectional image obtainment process shown in FIG. 2. However, the controller 90 calculates a focus evaluation value and determines focus on the basis of an output signal from the phase difference AF sensor 91, differently from the controller 70.

The light sheet microscope 700 as well can make the focal plane of the objective coincide with the light sheet plane swiftly and highly accurately, similarly to the light sheet microscope 500. It is also possible to consider inserting a convex lens into a space between the dichroic mirror 10 and the phase difference AF sensor 91 so as to increase NA of a light beam that enters the phase difference AF sensor 91, and thereby to increase the accuracy of a focus determination.

Eighth Embodiment

Figure 15:
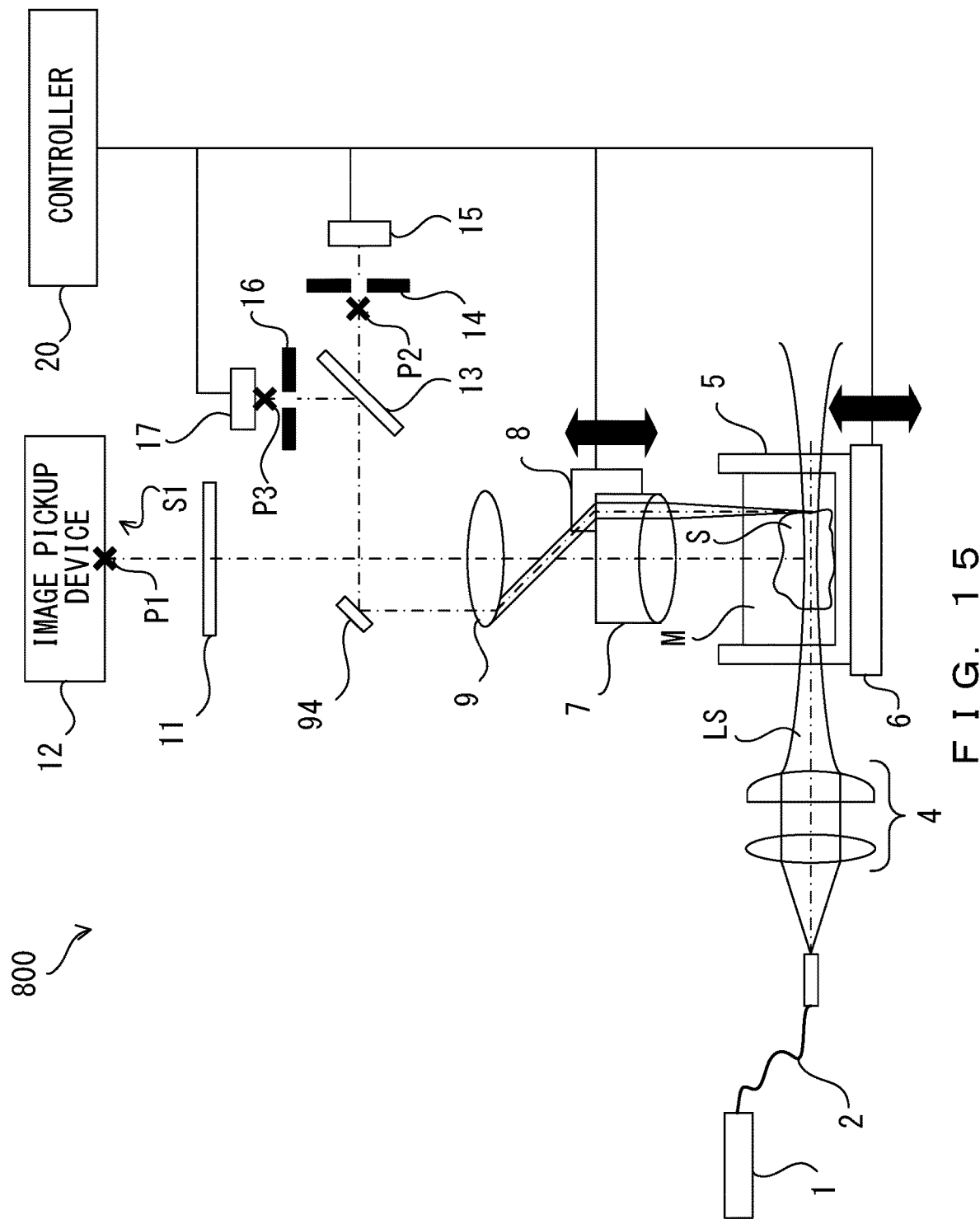
FIG. 15 exemplifies a configuration of a light sheet microscope 800 according to the eighth embodiment.

FIG. 15 exemplifies a configuration of a light sheet microscope 800 according to the present embodiment. The light sheet microscope 800 is different from the light sheet microscope 100 in that it includes a mirror 94 instead of the dichroic mirror 10. The other points are similar to the light sheet microscope 100.

The mirror 94 is arranged at a position out of the optical axis of the objective 7 that is in the optical path between the objective 7 and the image pickup device 12. In more detail, the mirror 94 is arranged at a position at which the mirror 94 does not block a light flux that is to be detected by the image pickup device 12. Note that ⅔-inch CCD cameras, which are often used for microscopes, usually utilize only about half of the field of view that microscopes inherently have.

The light sheet microscope 800 as well can make the focal plane of the objective coincide with the light sheet plane swiftly and highly accurately, similarly to the light sheet microscope 100. Also, a cross-sectional image can be obtained not via the dichroic mirror 10, making it possible to obtain a cross-sectional image that is brighter than one obtained by the light sheet microscope 100.

The above embodiments are specific examples shown in order to facilitate the understanding, and the embodiments of the present invention are not limited to them. The light sheet microscope and the control method thereof allow various modifications and changes without departing from the claims. For example, the controller may perform a continuous AF process that continuously controls the Z drive unit so that the light sheet plane and the focal plane become closer on the basis of light from the light sheet plane detected via the objective. Also, the controller may control the Z drive unit in each relative position between the sheet plane and the sample or may control the Z drive unit on the basis of light from the light sheet plane when the relative position between the sheet plane and the sample is at a prescribed position.

What is claimed is:

1. A light sheet microscope comprising:
   an objective;
   an illumination optical system that irradiates a sample with a light sheet from a direction that is different from an optical axis direction of the objective;
   a first adjustor that adjusts a relative position between a light sheet plane on which the light sheet is formed and the objective in the optical axis direction of the objective;
   a second adjustor that adjusts a relative position between the light sheet plane and the sample in the optical axis direction of the objective;
   an image pickup device that has a light-receiving surface and that obtains an image of the sample via the objective;
   a first light shielding plate that is arranged on a far side of a first position and that has an opening, wherein the first position is in an optical path branching from an optical path between the image pickup device and the objective and is optically conjugate with the light-receiving surface;
   a second light shielding plate that is arranged on a near side of a second position and that has an opening, wherein the second position is in the optical path branching from the optical path between the image pickup device and the objective and is optically conjugate with the light-receiving surface;
   a first photodetector that detects light that is from the light sheet plane and that passed through the first light shielding plate;
   a second photodetector that detects light that is from the light sheet plane and that passed through the second light shielding plate; and
   a controller that controls the first adjustor based on an output signal from the first photodetector and an output signal from the second photodetector when a relative position between the light sheet plane and the sample is changed by the second adjustor.

2. The light sheet microscope according to claim 1, wherein the controller is configured to control the first adjustor so that an evaluation value that is calculated from the output signal from the first photodetector and the output signal from the second photodetector becomes closer to a prescribed value.

3. The light sheet microscope according to claim 1, wherein the first light shielding plate and the second light shielding plate are provided in such a manner that the first and second light shielding plates move along the optical path.

4. The light sheet microscope according to claim 3, further comprising a third adjustor that adjusts positions of the first light shielding plate and the second light shielding plate, wherein the controller controls the third adjustor in accordance with a magnification of the objective.

5. The light sheet microscope according to claim 1, wherein the opening of at least one of the first light shielding plate and the second light shielding plate is a pinhole array.

6. The light sheet microscope according to claim 1, further comprising a dichroic mirror in the optical path between the objective and the image pickup device.

7. The light sheet microscope according to claim 1, further comprising a mirror that is arranged at a position out of an optical axis of the objective in the optical path between the objective and the image pickup device.

8. The light sheet microscope according to claim 1, wherein the controller is configured to control the first adjustor based on the output signal from the first photodetector and the output signal from the second photodetector for each relative position between the light sheet plane and the sample or when a relative position between light sheet plane and the sample is at a prescribed position.

9. The light sheet microscope according to claim 1, wherein the controller performs a continuous AF process of continuously controlling the first adjustor so that the light sheet plane and a focal plane of the objective become closer, based on the objective the output signal from the first photodetector and the output signal from the second photodetector.

* * * * *